United States Patent
Reinartz et al.

[11] Patent Number: 5,188,433
[45] Date of Patent: Feb. 23, 1993

[54] ANTI-LOCK HYDRAULIC BRAKE SYSTEM

[75] Inventors: Hans Reinartz, Frankfurt; Helmut Steffes, Hattersheim; Peter Volz, Darmstadt; Erhard Beck, Weilburg, all of Fed. Rep. of Germany

[73] Assignee: Alfred Teves GmbH, Frankfurt, Fed. Rep. of Germany

[21] Appl. No.: 690,912
[22] PCT Filed: Jul. 25, 1990
[86] PCT No.: PCT/EP90/01215
  § 371 Date: May 28, 1991
  § 102(e) Date: May 28, 1991
[87] PCT Pub. No.: WO91/04893
  PCT Pub. Date: Apr. 18, 1991

[30] Foreign Application Priority Data

Sep. 29, 1989 [DE] Fed. Rep. of Germany ....... 3932531

[51] Int. Cl.⁵ .......................... B60T 8/32; B60T 13/16
[52] U.S. Cl. .................................... 303/100; 303/9.62;
       303/9.75; 303/113.1; 303/116.1; 303/119.1;
       303/900; 303/901
[58] Field of Search ............... 303/100, 113 R, 116 R,
       303/113 TR, 113 TB, 113 AP, 10, 115 R, 115
       EC, DIG. 5, DIG. 6, 119 R, 116 PC, 116 SP,
       115 PP, 115 FM, 110, 91, 9.62, 9.75; 188/358;
       60/545, 591

[56] References Cited
U.S. PATENT DOCUMENTS 3,819,235  6/1974  Bowler et al. ................ 303/115 PP
4,762,300  8/1988  Inagaki et al. ................ 303/115 EC
5,098,173  3/1972  Beck et al. ...................... 303/116 R

FOREIGN PATENT DOCUMENTS 1022065  1/1958  Fed. Rep. of Germany .
3842699  6/1990  Fed. Rep. of Germany .
1574083  7/1969  France .
2200459  4/1974  France .

OTHER PUBLICATIONS

Patent Abstracts of Japan vol. 13 No. 318 Jul. 19, 1989.
Patent Abstracts of Japan vol. 5, No. 108 Jul. 14, 1981.
Patent Abstracts of Japan vol. 11 No. 146 May 13, 1987.

*Primary Examiner*—Douglas C. Butler
*Attorney, Agent, or Firm*—Nilles & Nilles

[57] ABSTRACT

In an anti-lock brake system, a differential pressure limiter (8) is connected in front of the inlet valve (6). This causes a defined pressure gradient to always prevail at the inlet valve (6), what appreciably reduces the noise emission of the valve during an anti-lock braking operation. Since the inlet valve (6) has a slight throttling effect in its opened position, it may occur that on brake operation with cold brake fluid a pressure gradient is generated at the inlet valve (6) which results in the differential pressure limiter closing. It is therefore suggested to arrange a bimetal spring (20) in parallel to the control spring (15) of the differential pressure limiter (8), which bimetal spring expands at low temperatures and cases a force in addition to the spring force of the control spring (15) to act on the control piston.

12 Claims, 2 Drawing Sheets

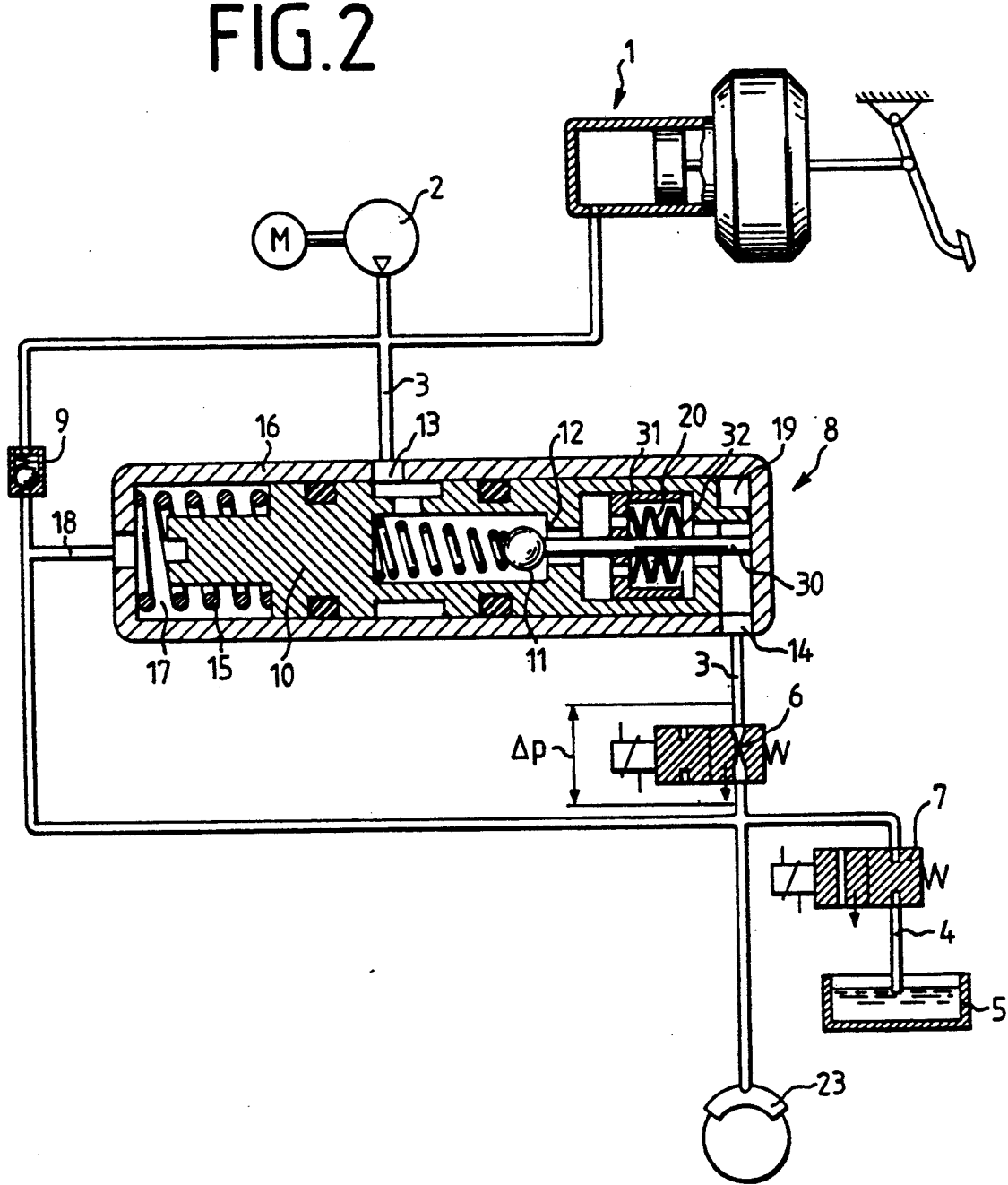

ANTI-LOCK HYDRAULIC BRAKE SYSTEM

INTRODUCTION

The present invention relates to an anti-lock hydraulic brake system comprising at least one wheel brake and an auxiliary-pressure source, an inlet valve being inserted into the pressure conduit between the auxiliary-pressure source and the wheel brake, and the wheel brake being connected to a return conduit via an outlet valve, with a differential pressure limiter being inserted into the conduit between the auxiliary-pressure source and the inlet valve, the control piston of which limiter is acted upon by both the force of a spring and the pressure in the wheel brake in a manner opening the conduit.

BACKGROUND OF THE INVENTION

A brake system of the type described above German Patent application is known from the P 38 42 699.4 filed Dec. 19, 1988. The differential pressure limiter ensures that a defined pressure prevails a cross the inlet valve. It has been proven that employment of this arrangement reduces the switching noises made by the inlet valve considerably. Yet there is also created a disadvantage: the inlet valve exhibits a throttling characteristic when in its opened position. On the one hand, this is due to design reasons, since the valve passage cannot be opened as wide as desired. On the other hand, however, there are considerations in respect of control technology: the velocity of pressure increase is to be limited in the pressure-build-up phase of a braking operation with anti-lock control in order to prevent the pressure from rising beyond a specific amount.

Once the master brake cylinder is actuated quickly and abruptly during braking without anti-lock control, a large quantity of pressure fluid is pressed through the throttle of the inlet valve in a short time. This causes a pressure difference across the inlet valve, the consequence thereof being in turn that the differential pressure limiter will close. Pressure build-up is decelerated. This phenomenon occurs in particular when the brake fluid is cold and has a high viscosity, at which time a slow pressure fluid speed will suffice to generate the critical pressure difference across the inlet valve.

BRIEF DESCRIPTION OF THE INVENTION

It is, therefore, the object of the invention to preserve the advantages of a differential pressure limiter, on the one hand, and to accomplish a rapid unhindered pressure build-up over the entire temperature range of the brake fluid in the event of braking without anti-lock control, on the other hand.

This object is achieved in that a temperature-responsive force-generating element acts upon the control piston.

Most simply, such an element can be a bimetal spring.

Principally, two ways of solution can be followed. On the one hand, the bimetal spring can be arranged in parallel with the control spring of the pressure limiter. When constructing the spring so as to expand when exposed to cold temperatures, an additional force generated by the bimetal spring will be provided at low temperatures besides the force of the control spring. Thereby, the switch point of the differential pressure limiter is raised, in consequence whereof the differential pressure limiter will not close, not even in the presence of high pressure difference across the inlet valve. In the presence of high temperatures, the bimetal spring will compress so much that its length becomes smaller than the coil-bound length of the control spring. Subsequently, the bimetal spring has no influence on the control behavior of the differential pressure limiter so that the switch point is determined by the control spring alone.

Another possibility resides in arranging the bimetal spring between the control piston and a tappet which abuts on the closure member of the differential pressure limiter. When the bimetal spring expands at cold temperatures, the closure member will be forced to lift from the valve seat so that the valve passage will remain open in any case irrespective of the movement of the control slide due to a pressure differences across the inlet valve.

The bimetal spring can be realized in various shapes. Individual bimetal spring elements may be designed as cup springs which are combined to form a cup spring assembly.

Another form provides that bent leaf springs are assembled centrically on their convex sides.

BRIEF DESCRIPTION OF THE DRAWINGS

In the following, the idea of this invention shall be explained in more detail by way of two embodiments. Herein.

FIG. 1 shall be referred to first.

DETAILED DESCRIPTION OF THE PREFERRED EMBODIMENT

Figure 1:
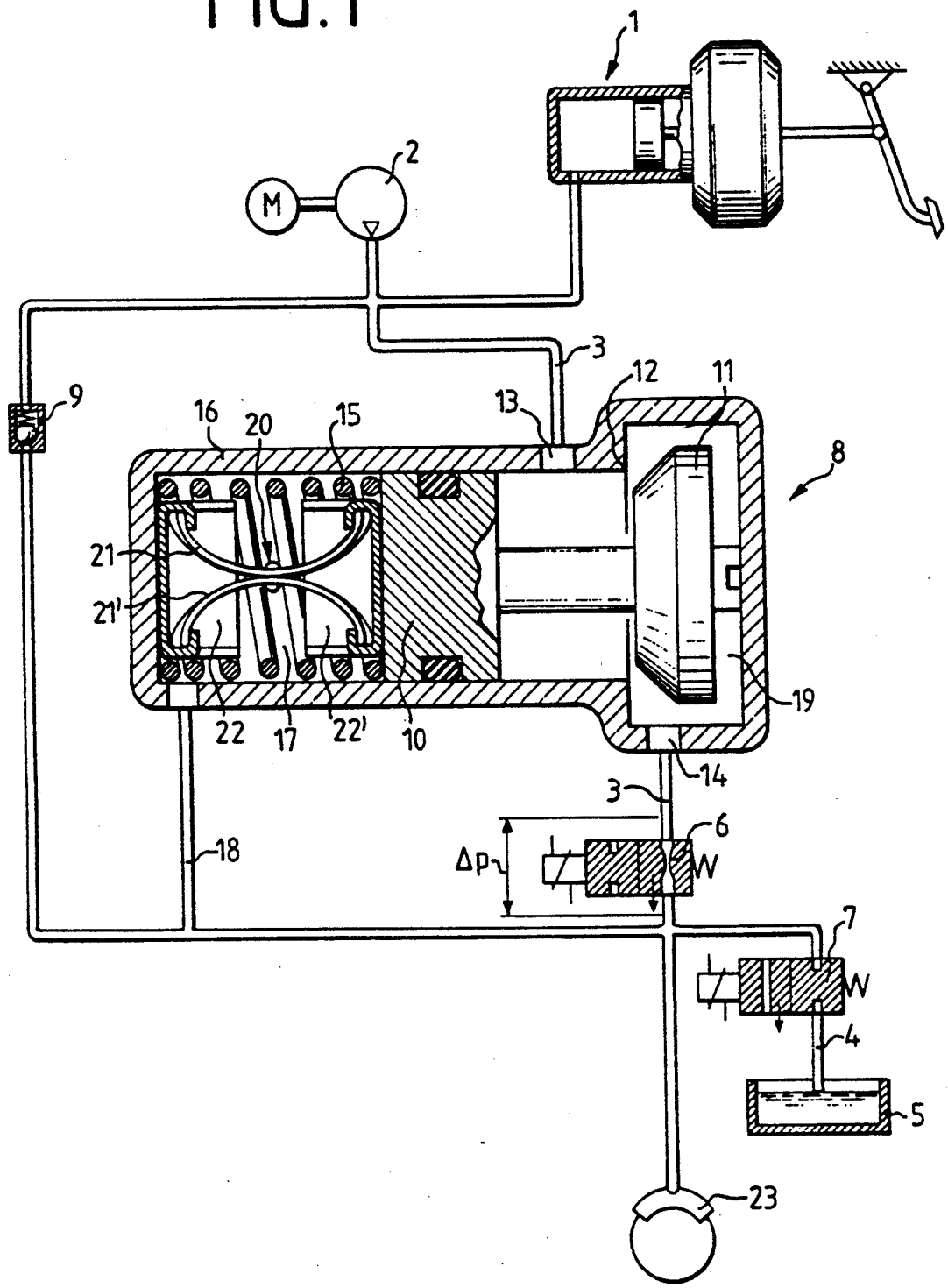
FIG. 1 shows a first embodiment and FIG. 2 a second one.

The brake system is composed of a master brake cylinder 1 and a pump 2 driven by a motor M. The master brake cylinder 1 and the pump 2 are each, via a branch conduit, in communication with the brake conduit 3 which leads to the wheel bake 23. The latter, in turn, communicates via a return conduit 4 with a supply reservoir 5. Inserted into the brake conduit 3 is an inlet valve 6 which is actuated electromagnetically, the valve 6 keeping the brake conduit open in its initial position and/or providing a slight throttling effect. An outlet valve 7 is inserted into the return conduit 4 which is likewise actuated electromagnetically, and closes the return conduit 4, in its initial position. A differential pressure limiter 8 is interposed between the master brake cylinder 1 and the pump 2, respectively, and the inlet valve 6. A non-return valve 9 is provided in a parallel line to the inlet valve 6 and the differential pressure limiter 8.

The differential pressure limiter 8 comprises a housing 16 in which a control piston 10 is sealingly guided.

According to the embodiment of FIG. 1, the control piston 10 is rigidly coupled to a closure member 11 cooperating with a valve seat 12 formed fast with the housing. A fluid connection is established through valve 11, 12 between ports 13 and 14. Pump 2 and/or master brake cylinder 1 is connected to the port 13, while port 14 is allocated to the inlet valve 6.

The control piston 10 is loaded by a control spring 15 which is supported on the control piston 10, on the one hand, and on the bottom of the housing 16, on the other hand. This control spring is accommodated in a control chamber 17 which is connected directly to the wheel brake via a branch conduit 18. The control spring 15 and the pressure in the control chamber 17 act upon the control piston 10 in such a fashion that the valve 11, 12 is kept open. The pressure in an outlet chamber 19 into which port 14 is provided acts as a counterpressure. As long as the pressure is equal in chambers 17 and 19, the spring 15 will keep the valve 11, 12 open. Valve 11, 12 closes as soon as the pressure in chamber 17 decreases and the difference ΔP between the pressures in chamber 17 and 19 is able to overcome the force of the spring 15.

Further, a bimetal spring 20 is arranged in the control chamber 17 and inside the chamber which is formed by the coil of control spring 15.

The bimetal spring 20 is composed of two bent leaf springs 21, 21', the centers of the convex sides of which are attached to each other. The leaf springs 21, 21' are disposed in one plane. The opposed ends of the leaf springs 21, 21' engage into a respective guide member 22, 22', the one guide member 22' bearing against the control piston 10, and the other guide member 22 being supported on the bottom of the housing 16.

The control spring 15 and the bimetal spring 20 are thus acting in the same direction.

When exposed to low temperatures, the bimetal spring expands so that the force of the bimetal spring will act in addition to the force of the spring 15, the switch point of the differential pressure limiter 8 being raised as a result.

When exposed to heat, the bimetal spring 20 compresses so that its length becomes smaller than the coil-bound length of the control spring 16. Therefore, the bimetal spring is no longer able to exert any force on the control piston 10 so that the switching pressure of the valve 11, 12 will now be determined only by the preload of spring 15.

This has as a result that the valve 11, 12 will not be closed at low temperatures, not even in the event of a great pressure differential across the inlet valve 6.

The embodiment of FIG. 2 corresponds largely to that of FIG. 1. Therefore, like parts have been assigned like reference numerals. A difference resides in that the closure member 11 is arranged inside the control piston 10. The valve seat 12 is provided on the control piston 10. The valve closure member 11 abuts on a tappet 30 which is supported on the bottom of the housing. A collar 31 is provided on the tappet 30. Between this collar and the control piston 10, the bimetal spring 20 is arranged in the form of a cup spring assembly 32.

The control piston 10 bears against the right housing wall in the initial position shown. The tappet 30 keeps the valve member 11 spaced from the valve seat 12. There is thus a free valve passage.

As soon as a pressure difference ΔP prevails across the inlet valve 6 which is above the switch point predetermined by the control spring 15, the control piston 10 will be displaced to the left so that the valve seat 12 is moved to abut on the closure member 11. The valve passage is thus closed.

The bimetal spring 20 expands when exposed to cold temperatures and will abut both on the collar 31 and on the control piston 10.

When the control piston 10 is now displaced due to a pressure difference across the inlet valve 6, the tappet 30 will be displaced as well so that the closure member 11 remains spaced from the valve seat 12. A free valve passage continues to exist.

When exposed to high temperatures, the bimetal spring 20 is contracted again and is placed with a clearance between the collar 31 of the tappet 30 and the control piston 10.

What is claimed is:

1. An anti-lock hydraulic brake system comprising:
   a hydraulic pressure source interconnected with at least one wheel brake through a pressure conduit including an inlet valve, said wheel brake interconnected to a return conduit through an outlet valve;
   a differential pressure limiting means connected within said pressure conduit intermediate said pressure source and inlet valve, said pressure limiting means responsive to wheel brake pressure to switch from an open condition to a closed condition at a predetermined pressure threshold value; and
   temperature responsive means operative to change said pressure threshold value as a function of a hydraulic fluid temperature.

2. An anti-lock hydraulic brake system comprising: at least one wheel brake, an auxiliary-pressure source, an inlet valve disposed within a pressure conduit between the auxiliary-pressure source and the wheel brake, the wheel brake being connected to a return conduit via an outlet valve, and a differential pressure limiter disposed within the pressure conduit between the auxiliary-pressure source and the inlet valve, the differential pressure limiter including a control piston which is acted upon by both the force of a control spring and pressure in the wheel brake in a manner opening the pressure conduit, wherein a temperature-responsive force-generating element acts upon the control piston.

3. A brake system as claimed in claim 2, wherein the element is a bimetal spring.

4. A brake system as claimed in claim 3, wherein the bimetal spring is supported on the control piston, and on a valve housing, with a closure member being rigidly coupled to the control piston.

5. A brake system as claimed in claim 3, wherein the control spring and the bimetal spring act upon a common side of the control piston.

6. A brake system as claimed in claim 3, wherein the differential pressure limiter includes a closure member which abuts on a tappet which is supported on a valve housing, with a valve seat being arranged on the control piston.

7. A brake system as claimed in claim 6, wherein the bimetal spring is supported on the control piston and on the tappet.

8. A brake system as claimed in claim 7, wherein the bimetal spring is designed so as to move, at low temperatures, the tappet in relation to the control piston in such a manner that the closure member is lifted from the valve seat.

9. A brake system as claimed in claim 3, wherein the bimetal spring is designed as a cup spring assembly.

10. A brake system as claimed in claim 2, wherein the bimetal spring is composed of two bent leaf springs which have convex sides attached to each other at central portions thereof, the leaf springs lying in one plane.

11. A brake system as claimed in claim 10, wherein each of the leaf springs has opposed ends, each of which engages into a respective guide member, one guide member abutting on the control piston, while the other guide member abuts on the bottom of a valve housing.

12. A brake system as claimed in claim 11, wherein the leaf springs and the guide members are arranged within the control spring.

* * * * *